United States Patent [19]

Stuhldreher et al.

[11] Patent Number: 4,531,902
[45] Date of Patent: Jul. 30, 1985

[54] APPARATUS FOR MAKING IMPROVED TIRE CURING BLADDERS

[75] Inventors: Terrence M. Stuhldreher, Wadsworth, Ohio; Rene L. Rockarts, Northport, Ala.

[73] Assignee: The B. F. Goodrich Company, Akron, Ohio

[21] Appl. No.: 551,545

[22] Filed: Nov. 14, 1983

[51] Int. Cl.$^3$ .............................................. B29C 1/00
[52] U.S. Cl. ................................... 425/408; 425/412; 425/812; 425/437; 425/438; 425/393; 249/142; 249/149
[58] Field of Search ................. 425/28 R, 29, 30, 31, 425/32, 33, 34 R, 34 A, 408, 35, 38, 39, 40, 41, 43, 383, 390, 392, 393, 394, 395, 401, 407, 406, 543, DIG. 47, DIG. 44, 409, 410, DIG. 42, 411, 412, 414, 408; 264/326, 317, 161, 328.2, 225, 322, 328.2, 328.5

[56] References Cited

U.S. PATENT DOCUMENTS

| | | | |
|---|---|---|---|
| 2,473,284 | 6/1949 | Knaggs | 425/DIG. 47 |
| 2,615,203 | 10/1952 | Du Pree | 264/326 X |
| 2,949,635 | 8/1960 | Chiero | 425/410 X |
| 3,475,790 | 11/1969 | Bush et al. | 425/DIG. 47 |
| 3,536,806 | 10/1970 | Jackson | 425/DIG. 47 |
| 3,613,223 | 10/1971 | Bush | 425/DIG. 47 |
| 3,660,002 | 5/1972 | Morroni | 425/437 X |
| 3,666,229 | 5/1972 | Carrel-Billiard | 425/437 X |
| 3,773,454 | 11/1973 | Horve et al. | 425/DIG. 47 |
| 4,257,994 | 3/1981 | Leblanc et al. | 425/38 X |

Primary Examiner—J. Howard Flint, Jr.
Attorney, Agent, or Firm—Harry F. Pepper, Jr.; Philip P. McCann

[57] ABSTRACT

The quality and useful life of curing bladders used in standard "Bag-O-Matic" tire vulcanizing presses is greatly improved by replacing the standard split two-piece core of the bladder mold with a unitary core which forms a disc-like rubber diaphragm below the core and integral with the rubber curing bladder at the periphery of the core. A unique base plate fits in the lower mold half below the core and has a grooved upper surface to hold the diaphragm in place so that the core can be removed manually or automatically with the assistance of internal air pressure.

6 Claims, 10 Drawing Figures

APPARATUS FOR MAKING IMPROVED TIRE CURING BLADDERS

BACKGROUND OF THE INVENTION

The present invention relates to the shaping and vulcanizing of curing bladders used in tire manufacture.

For several decades tire manufacturers have employed automatic vulcanizing presses, such as the McNeil "Bag-O-Matic" presses shown in various patents of L. E. Soderquist. These presses employ butyl rubber curing bladders which fit within the tire during the vulcanizing operation and which are readily removed from the finished tire at the end of each curing cycle. One curing bladder can be used to cure 200 to 300 tires or more.

During the last 30 years attempts have been made to improve the useful life of the curing bladders and to minimize the cost of shaping and vulcanizing such bladders. The tire industry has employed standard types of vulcanizing molds which facilitate economical production of the curing bladders and which employ split cores to help in removal of the cured bladder from the core at the end of the cycle.

The lower section of the split core, known as the "core plate", fits the main upper section of the core and fits within the lower mold half. The upper section fits within the upper mold half and extends into the lower mold half. When the mold is new the two core sections will register properly with the upper and lower mold halves and the curing bladder can be formed with the desired uniform wall thickness. However, normal wear and metal distortion resulting from extended use of the mold causes the two core sections, when registered together, to be too small for the space provided for them within the two mold halves, and the result is that the core assembly will register against either the top or bottom mold half and the bladder will have non-uniform wall thickness.

Another result of such wear is that the core plate will register against the bottom mold half and the main core section will register against the top mold half so as not to be properly located relative to the core plate. This promotes rubber stock intrusion into the gap left between the main core section and the core plate which will produce a thin fin of substantial width on the inside of the finished bladder. Even when the mold parts fit together perfectly, the forces of stock flow during molding can cause the main core section and the core plate to separate and allow such intrusion of the stock into the gap between the core sections.

The above problem cannot be solved merely by enlarging the core or reducing the clearances because the core does not have the strength required to support the tremendous forces applied by the hydraulic press. Clearances are essential to prevent fracture of the core, and molds are commonly designed to allow the registering surfaces in the mold halves to deform rather than to transmit excessive forces that could fracture the core. This design in turn leads to early wear or enlargement of the clearances and return to the problems described previously.

Despite these problems the use of a split core with a core plate (rather than a one-piece core) has been necessary to permit removal of the finished curing bladder from the core and to permit economical production. The core plate is necessary to hold the finished curing bladder in the bottom mold half while the main upper core section is pulled out of the bladder. The core plate is then lifted from the bottom mold half to permit removal of the bladder.

The bladder molds described above have been standard in the industry for many years and have been considered the most practical in spite of the above problems. The use of these molds has limited the quality of the curing bladders and their useful life and has made it difficult to produce thin-wall bladders with satisfactory service life (i.e., bladders with a wall thickness below 0.2 inch).

The flow of rubber is seriously disturbed as the result of rubber stock intrusion into the gap between the core plate and the main core section (see the photograph of FIG. 10). The rubber forced into this gap becomes partially cured and is then forced out of the gap back into the mold cavity so as to form a defect in the bladder wall. Such defects are a major cause of failure.

SUMMARY OF THE INVENTION

Our invention provides a simple economical solution to the problems described above and makes it possible to mass produce curing bladders with a quality far superior to those produced by conventional methods.

The invention involves use of a bladder mold having a one-piece unitary core and involves formation of a unique rubber diaphragm at the bottom of the core integral with the curing bladder so that air under pressure may be introduced between the diaphragm and the core to assist in removal of the core from the diaphragm and the bladder.

The bladder mold of this invention has a unitary core which fits within the two mold halves and extends the full height of the peripheral mold cavity. A central base plate is mounted in a central opening in the bottom mold half and is spaced a small distance from the bottom of the core to define a bottom mold cavity. The peripheral mold cavity has a shape corresponding to that of the curing bladder, and the bottom mold cavity has a shape corresponding to that of the aforesaid diaphragm. The base plate is preferably provided with a series of grooves which serve as air vents and which provide a temporary connection between the cured diaphragm and the base plate.

In carrying out the process, an uncured annular rubber preform is placed on the bottom mold half, and then the upper and lower mold halves are forced together by a hydraulic press to cause the rubber to flow upwardly and downwardly from the parting line to fill the peripheral mold cavity and form the curing bladder. The rubber also flows under the core to fill the bottom mold cavity and to form a thin annular diaphragm integral with the curing bladder.

When vulcanization is completed in the heated mold, the upper mold half is raised, air under pressure is introduced manually or automatically between the core and the cured rubber piece, and the core is then lifted to separate the core from the diaphragm and to remove the core from the bladder (see FIG. 8). The base plate at the center of the bottom mold half is then raised to permit removal of the diaphragm from the plate. The diaphragm is then cut around the circumference to separate it from the curing bladder.

The process produces a bladder with a smooth inner surface free of fins or surface defects and permits maintenance of close tolerances without the wear and distortion problems characteristic of prior art methods. It thus becomes possible to produce curing bladders with a wall thickness of 0.1 to 0.2" (inch) which have long service life. The process also increases the useful life of the bladders by eliminating the flow problems and wall defects caused by split cores and core plates.

An object of the invention is to provide a simple economical apparatus for shaping and vulcanizing curing bladders which maintains close dimensional tolerances and maximizes service life.

BRIEF DESCRIPTION OF THE DRAWINGS

The foregoing and other objects and advantages of our invention will appear more fully from the following description, made in connection with the accompanying drawings of preferred embodiments of the invention, wherein like reference characters refer to the same or similar parts throughout the several views and in which.

DETAILED DESCRIPTION OF THE PREFERRED EMBODIMENTS

Figure 1:
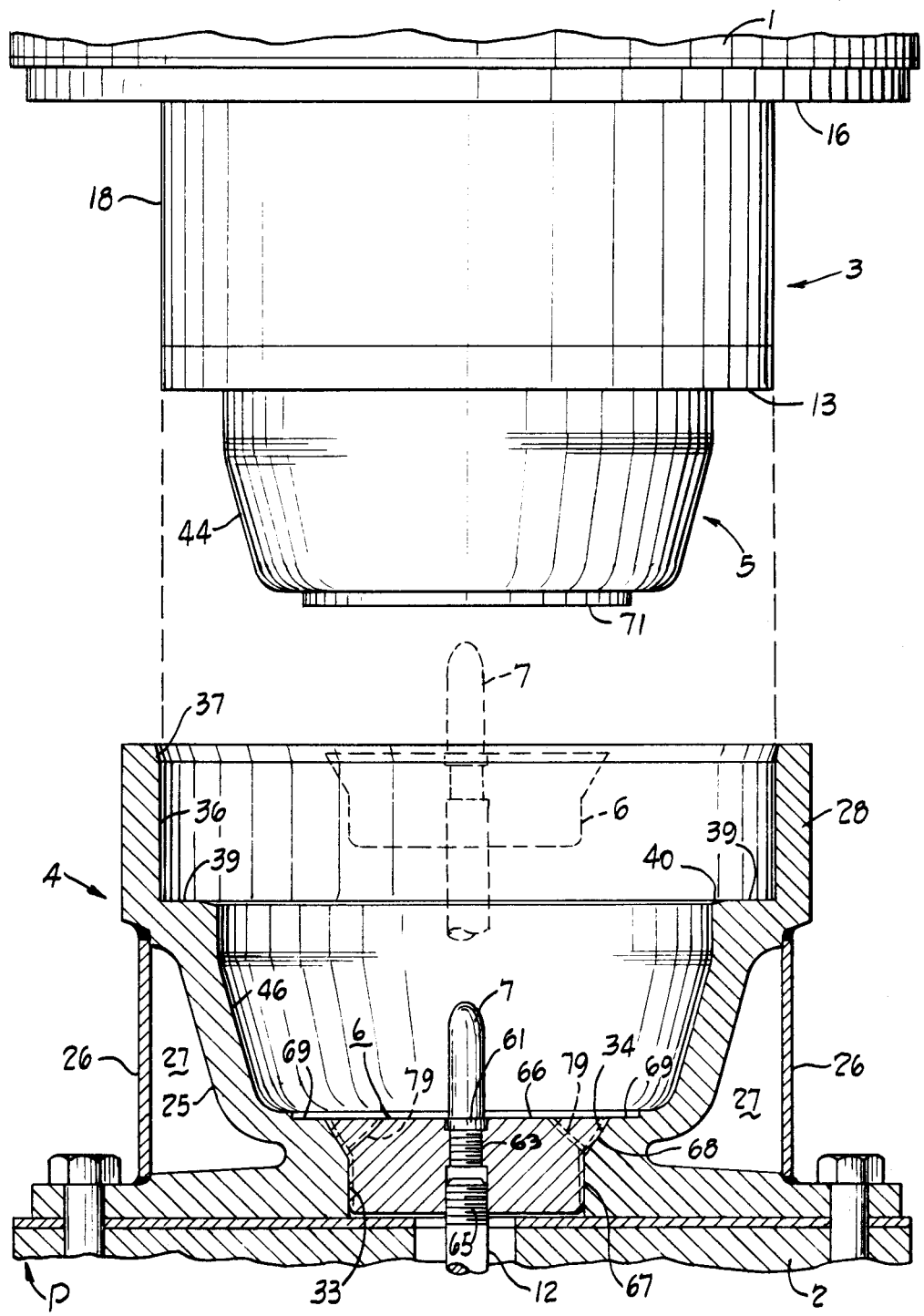
FIG. 1 is a partial side elevational view on a reduced scale showing a hydraulic press with a bladder mold constructed according to the invention in an open position, the lower mold half being shown in section.
Figure 2:
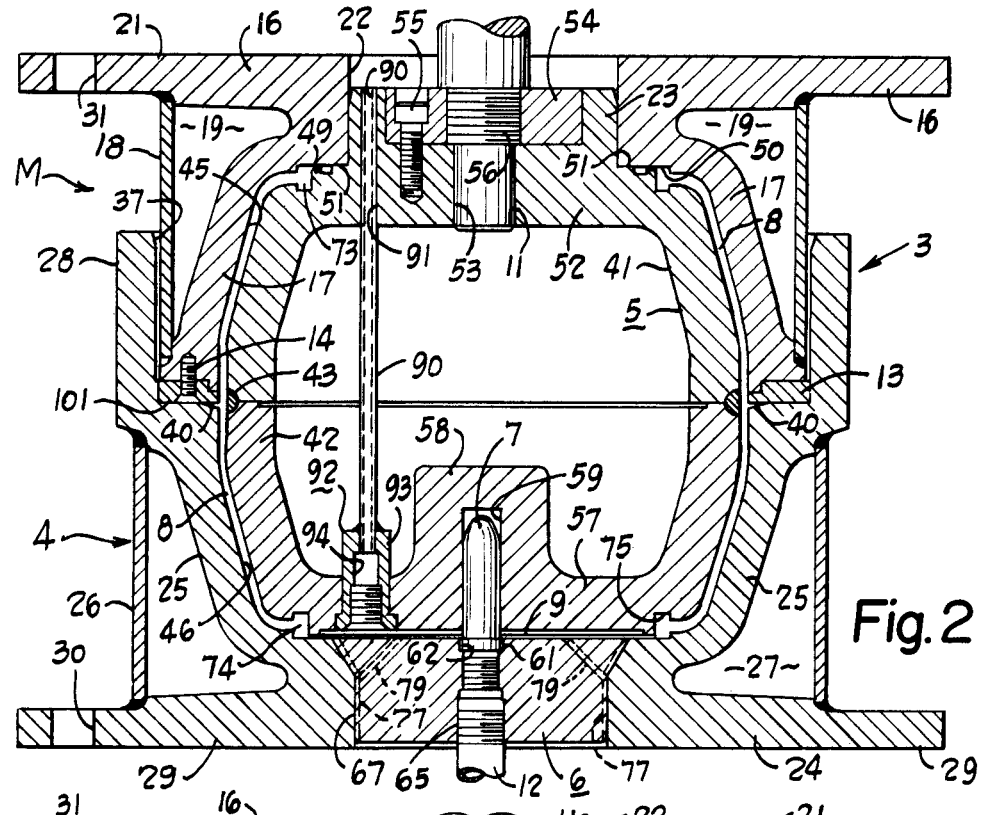
FIG. 2 is a fragmentary vertical sectional view on a reduced scale showing the mold in the closed position.

Referring more particularly to the drawings, which are drawn to scale to facilitate an understanding of the invention, FIG. 1 shows one embodiment of a bladder mold M according to the invention mounted on a conventional hydraulic press P having a fixed upper platen 1 and a movable lower platen 2. The mold M comprises upper and lower mold sections 3 and 4, an annular core 5 supported from the upper portion of the press and an annular base plate 6 mounted in a central opening in the lower mold half and movable vertically to an elevated position, such as that shown in broken lines in FIG. 1. The base plate has a central guide pin 7 for locating the core coaxial with the lower mold half 4. As shown in FIG. 2, the mold parts fit together to define a peripheral mold cavity 8 with a shape corresponding to that of the curing bladder B and a bottom horizontal mold cavity 9 between the base plate 6 and the core 5 which forms a rubber diaphragm 10 integral with the curing bladder.

Figure 3:
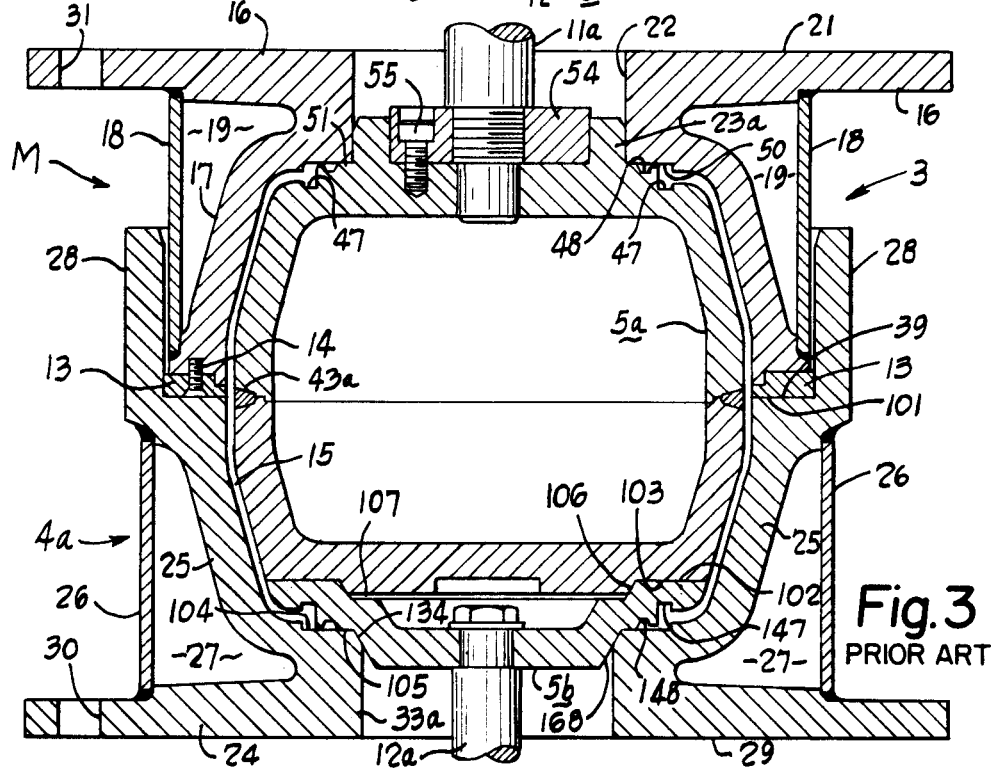
FIG. 3 is a fragmentary sectional view similar to FIG. 2 showing a conventional prior art bladder mold.

FIG. 3 illustrates the standard mold used in the tire industry for manufacture of curing bladders. The mold M' comprises upper and lower mold halves 3a and 4a, an annular main core section 5a and an annular core plate 5b which fits in the lower mold half. The core is mounted on a piston rod 11 for vertical movement and fits against the upper mold half. The core plate 5b is mounted on a piston rod 12 which moves vertically to lift the plate at the end of the cycle.

A replaceable filler ring 13 is rigidly connected to the upper mold half 3a and held in place by a series of screws 14. The ring may be replaced with a ring of different axial length if it is desired to change the size of the curing bladder.

Figure 4:
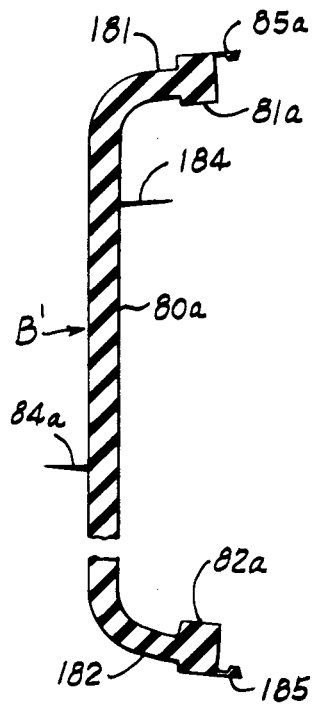
FIG. 4 is a foreshortened sectional view showing a conventional curing bladder as formed in the mold of FIG. 3.
Figure 5:
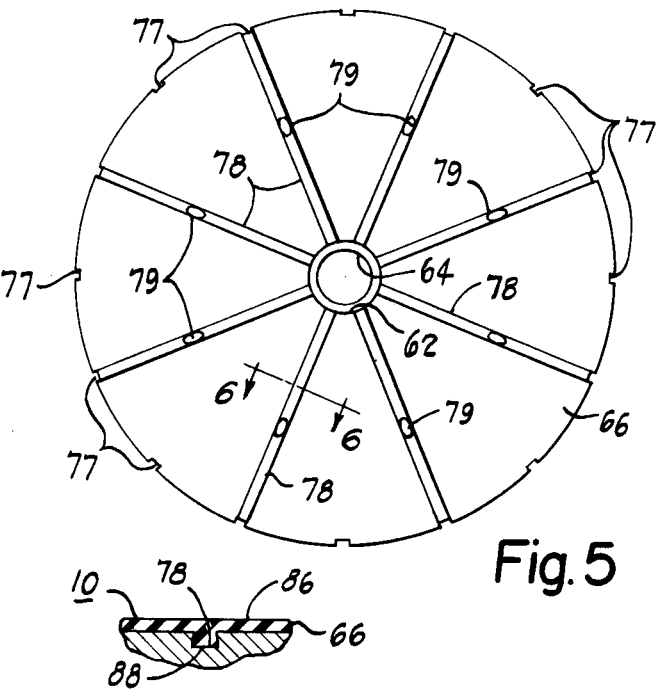
FIG. 5 is a fragmentary top view on a reduced scale showing the rubber diaphragm.
Figure 6:
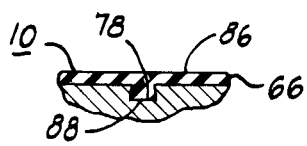
FIG. 6 is a fragmentary top view on a reduced scale showing the base plate for forming the rubber diaphragm.

When the mold M' is closed as shown in FIG. 3, the two sections 5a and 5b of the core fit within the mold halves to define a mold cavity 15 with a size and shape corresponding to that of curing bladder. FIG. 4 shows a curing bladder B' which may be made in the mold M' after the parts have been subjected to substantial wear and distortion.

The mold M as shown in FIG. 2 is the same size as the mold M' and can produce a curing bladder B which is the same size as the bladder B'. The mold M is of simple construction and the two annular mold halves 3 and 4 are almost identical to the mold halves 3a and 4a of the mold M'. In the embodiment shown in FIG. 2 the annular upper section 3 has a horizontal portion 16 and a peripheral wall portion 17 welded to a thin cylindrical member 18 so as to define an annular steam chamber 19. The upper section has a flat horizontal upper surface 21 for engaging the upper platen of the press P and a cylindrical internal surface 22 for receiving the cylindrical upper portion 23 of the core 5.

The annular bottom mold section 4 is similar to the upper section 3 and has a horizontal portion 24 and a peripheral wall portion 25 welded to a thin cylindrical member 26 to define an annular steam chamber 27. The section 4 also has a cylindrical outer wall portion 28 above the member 26. The portion 24 has a flat horizontal bottom surface 29 parallel to surface 21 for engaging the lower platen of the press P and has a series of bolt holes 30 around the circumference to permit attachment of the mold to the press platen. Similar holes 31 are provided in the upper mold half for the same purpose.

The mold section 4 has an internal cylindrical surface 33 and an internal tapered surface of revolution 34 which fit the external surface of the base plate 6 as shown in FIG. 2.

The externally cylindrical upper wall portion 28 of the bottom mold section has an internal surface 36 with a few degrees of taper and a beveled internal surface 37. The surface 36 fits the peripheral surface of the filler ring 13 when the mold is closed. The latter has a flat horizontal bottom surface 101 which rests on the flat horizontal upper surface 39 of the lower mold section at the parting line of the mold. The flat heads of the screws 14 are flush with bottom surface 101 of the filler ring so that an essentially perfect fit may be obtained. The surface 39 may have a width corresponding to that of the filler ring 13 and extends from wall portion 28 substantially to the mold cavity 8. A slight taper may be provided adjacent the mold cavity to facilitate flow of the rubber during molding as is conventional in the art. As shown a tapered surface 40 extends around the circumference of the mold cavity 8 at the parting line. It will be understood that the two mold sections 3 and 4 are conventional except for the modifications needed to accommodate the new core 5 and the base plate 6.

The unitary core 5 shown in FIG. 2 functions as an integral one-piece core and is preferably formed in two sections 41 and 42 which are integrally connected as by a circumferential weld 43. The outer surfaces of the portions 41, 42 and 43 are accurately machined and polished to provide the core 5 with a smooth outer shaping surface 44, and the inner surfaces of the wall portions 17 and 25 of the mold are similarly shaped to provide internal shaping surfaces 45 and 46 concentric to the surface 44. If desired the latter surface may be provided with shallow indentations to provide a predetermined pattern in the outer surface of the bladder wall 80.

The annular upper section 41 of the core has conventional annular grooves 47 and 48 and an intermediate rib portion 49 spaced from the flat horizontal inner surface 50 of the upper mold section 3 a distance sufficient to permit rubber flow to the groove 48. The core 5 also has a narrow flat horizontal surface 51 extending from groove 48 to the cylindrical portion 23 and engageable with surface 50 to locate the axis of the core perpendicular to the parting line at 39.

The core 5 is moved vertically by a piston (not shown) having a piston rod 11 rigidly connected to the core. As shown herein the upper section 41 of the core has a top wall portion 52 with a central bore 53 to receive shaft 11, and the cylindrical portion 23 has an annular recess to receive an annular connecting plate 54 held in place by a series of circumferentially spaced screws 55. The plate is internally threaded to receive the external threads 56 of the rod 11.

The annular lower section 42 of the core has a bottom wall portion 57 with an upwardly projecting central portion 58 and a cylindrical bore 59 to receive the vertical guide pin 7. The pin 7 fits the bore 59 at the bottom of the core, and the cylindrical portion 23 fits the bore 22 at the top of the core to hold the core coaxial with the mold halves 3 and 4 when the mold is closed as shown in FIG. 2. The upward pressure on the piston rod 11 holds the core against the upper mold half at surface 50 and out of engagement with the lower mold half.

The guide pin 7 is rigidly mounted on the annular base plate 6 coaxial with the plate. As shown the pin has a cylindrical portion 61 of increased diameter which fits in a counterbore 62 of the base plate and a threaded lower portion 63 screwed into the internally threaded central bore 64 of the base plate above and coaxial with the piston rod 12. The latter has a threaded end portion 65 which is screwed into the internally threaded central bore in the lower half of the base plate.

The base plate 6 has a flat horizontal upper surface 66, a cylindrical outer surface 67, and a frusto-conical outer surface 68 and is accurately formed to provide an essentially perfect fit in the lower mold section 4 so as to seal the bottom of the mold. The surface 66 is flush with the flat horizontal surface 69 of the mold section 4 and parallel to the flat horizontal bottom surface 71 of the core 5 when the mold is closed and is spaced from said bottom surface a small fraction of an inch (i.e., from 0.1 to 0.3 inch) so that the rubber can flow into and fill the bottom mold cavity 9.

The core 5 has a narrow circular rib 72 at the periphery of surface 71 which is spaced from surface 69 a distance, such as 0.04 to 0.1 inch, adequate to permit rubber flow from the peripheral mold cavity 8 to the bottom mold cavity 9. The cavity 8 has the standard shape with portions 73 and 74 of enlarged cross section at the grooves 47 and 75 of the core which form the enlarged annular bead portions 81 and 82 of the rubber bladder B. The rib 72 forms an annular groove 83 at the margin of the rubber diaphragm 10 which facilitates cutting the diaphragm to separate it from the bladder. A similar groove is formed by the circular rib 49 between the grooves 47 and 48 at the top of the core.

The annular base plate 6 shown herein is provided with sixteen regularly spaced narrow vent grooves 77, each extending downwardly at surfaces 67 and 68 from the top to the bottom of the plate, and the upper face of the base plate is provided with eight regularly spaced dovetail vent grooves 78 extending radially from the counterbore 62 to the periphery of the base plate, half of them being aligned with the vent grooves 77. As shown, there are eight more inclined regularly spaced vent passages 79 of circular cross section, each extending from a radial groove 78 to a vertical groove 77 at the junction of surfaces 67 and 68.

Figure 7:
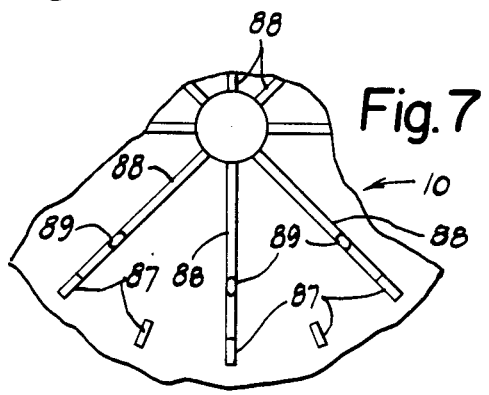
FIG. 7 is a fragmentary sectional view looking in the direction of the arrows 7—7 in FIG. 6 and showing the dovetail connection of the diaphragm to the base plate.
Figure 9:
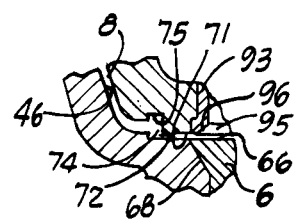
FIG. 9 is a fragmentary view similar to FIG. 2.

The vent passages 77, 78 and 79 are filled or substantially filled with rubber so that the molded rubber diaphgram 10 has a series of elongated projections 87 and 89 corresponding to the vents 77 and 79 and a series of radial ribs 88 corresponding to the dovetail grooves 78. These are illustrated in FIG. 7, it being understood that the projections 87 and 89 may sometimes have a length of several inches or may be torn as they are removed from the base plate. It will also be understood that the inclination of the sides of the dovetail grooves 78 may be selected so that the force required to remove the rubber ribs 88 from the grooves 78 is adequate to permit core removal but not so high as to interfere with manual removal of the diaphragm 10 from the elevated base plate 6 at the end of the cycle.

In accordance with the invention, suitable means are provided to introduce air or other fluid under pressure between the inner surface of the molded curing bladder B and the outer surface of the core 5 to assist in removing the core from the bladder. The air or gas is preferably directed from the core to the interior of the rubber bladder rather than through the wall of the bladder or the wall of the diaphragm 10. A convenient location, such as the upper or lower end of the core 5, may be selected for the air supply. As herein shown, the air is supplied through a check valve at the bottom of the core. The air may be supplied to the check valve through suitable conduit means from above or below the core and it may be supplied manually or automatically.

As herein shown, a vertical tube 90 fits in a bore 91 of the core wall 52 and extends from the top of the core portion 23 to a conventional one-way check valve 92 to permit introduction of air at a moderate pressure, such as 50 to 120 psig, to the top of the rubber diaphragm 10. The check valve may be of any conventional construction. As herein shown, an annular housing 93 is provided having a bore 94 that receives a normally-closed poppet valve member 95. The check valve 92 is of conventional construction and is not illustrated in detail. The valve member 95 is biased in an upward direction by a spring (not shown) which holds the valve closed during the molding operation. The valve member seals against the valve seat to prevent entry of rubber into the valve.

The mold shown in FIG. 3 is conventional and typical of molds used during the last decade for manufacture of Bag-O-Matic ® curing bladders. At the parting line, the ring 13 has a flat horizontal bottom surface 101 which rests on the flat horizontal upper surface 39 of the lower mold half 4*a* when the mold is closed. The annular core plate 5*b* has a flat horizontal upper surface 102, which engages a flat horizontal bottom surface 103 of the core section 5a, and has a beveled surface 106 which fits the projecting lower end portion of the core section 5a as shown in FIG. 3 to hold the two core sections in axial alignment.

The lower mold half 4a has a flat horizontal upper surface 104 which engages a flat horizontal lower surface 105 of the core plate 5b. When the mold is new, the surfaces 101 through 105 are parallel so that the core is properly located in the mold to produce a bladder having uniform wall thickness. Clearances must be provided to prevent excessive force on the core during molding. As shown the core plate 5b has a flat horizontal upper surface 107 spaced from the flat bottom surface of the upper core section 5a. A slight clearance must also be provided at surfaces 50 and/or 104, but the clearance may be small to restrict or prevent rubber flow during molding.

In order to provide the rubber curing bladder with dimensional accuracy, it is desirable that the parts of the mold fit together properly and are properly located. In the conventional mold of FIG. 3, there are basically four pairs of register surfaces which locate the parts. The first pair comprises surfaces 101 and 39 at the parting line. The second pair comprises surfaces 102 and 103, and the third pair comprises surfaces 104 and 105. The fourth pair comprises surfaces 50 and 51 near the top of the core. These four pairs are interdependent, and the ideal situation where all register surfaces meet properly is rarely accomplished because of normal wear and distortion of the parts. The most wear occurs at the narrow surfaces 51 and 105. After the mold has been in service for a year or two, the two core sections 5a and 5b are too small for the space provided for them so that the core assembly can engage and register with either the top or bottom mold half. This will result in poor gauge uniformity in the finished bladder B′ with the top half being thicker than the bottom half or vice versa.

FIG. 4 illustrates a bladder B′ which was produced in a badly worn mold. The bladder has a thin main wall 80a and enlarged bead portions 81a and 82a with fins 85a and 185 formed by the excess rubber in the grooves 48 and 148 of the mold. The rounded wall portion 181 adjacent bead 81a is too thick, and the rounded portion 182 adjacent bead 82is too thin. A fin 84a is formed at the parting line of the mold and creates no serious problem. A similar fin 84 is formed on the bladder B in the practice of this invention.

The conventional bladder mold, as exemplified by the mold of FIG. 3, produces a fin 184 extending around the interior of the bladder B′ because of the entry of rubber between surfaces 102 and 103. The forces exerted by the unvulcanized rubber during molding cause the core section 5a and the core plate 5b to separate and allows intrusion of the rubber stock into the gap between the hot mold surfaces 102 and 103, even in a new mold with close tolerances. The rubber in this gap is partially cured in a short period of time by contact with the hot mold.

As the mold approaches the completely closed position after the rubber fills the mold cavity, the top and bottom mold halves squeeze the two core sections back together so that the stock in said gap is forced back into the mold cavity. The remaining fin 184 is very thin, even in a worn mold.

Figure 10:
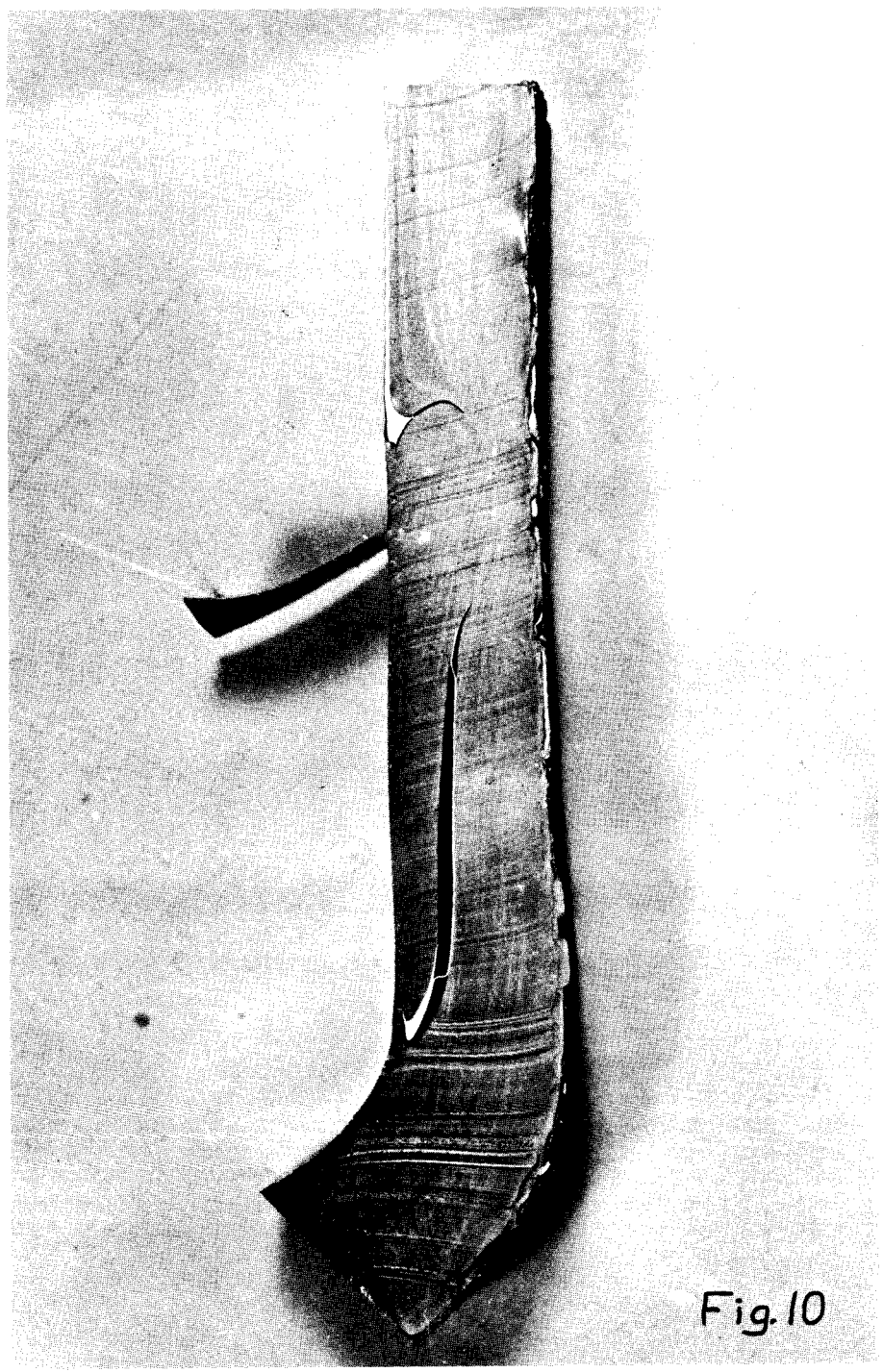
FIG. 10 is a photograph showing a portion of a test specimen.

We have found that there is a drastic interference with rubber flow in this type of molding operation as illustrated in the photograph of FIG. 10. A test was run using white gum stock to demonstrate the flow of the rubber in a typical molding operation. It is manifest from the photograph that the normal rubber flow has been seriously disturbed because of the inward flow of rubber from the gap between the two core sections (i.e., at surfaces 102 and 103) and because of the partial curing of this rubber while in said gap. The test demonstrates the seriousness of the defect in the bladder wall in the vicinity of the internal fin 184 and why the bladder is subject to premature failure in this region. Such a defect is typical in all curing bladders made by the conventional method and is particularly serious after the bladder mold has been in service for an extended period of time.

The present invention completely eliminates the above defect and makes it possible to provide a bladder with a vastly improved service life. This is particularly valuable in modern curing processes requiring higher curing temperatures and shorter curing times. The life of the bladder is also improved because of the ability to maintain uniformity in the thickness of the bladder wall. The present invention makes it practical to produce bladders with reduced wall thicknesses, such as 0.1 to 0.15 inch, which are highly desirable in certain modern curing processes.

In carrying out the process, an annular preform of unvulcanized rubber is placed on the surface 39 of the lower mold half 4 which is raised by a ram to compress the rubber between the two mold halves 3 and 4. The rubber flows upwardly and downwardly from the parting line at 39 to fill the mold cavity 8 and also to fill the diaphragm cavity 9 between the unitary core 5 and the base plate 6. The excess rubber at groove 48 forms a fin 85 on the bead portion 81 of the bladder. The excess rubber at the bottom of the core partially fills the vent passages of the base plate. The radial grooves 78 of the base plate serve as vent means to remove air as the rubber fills the cavity 9.

Figure 8:
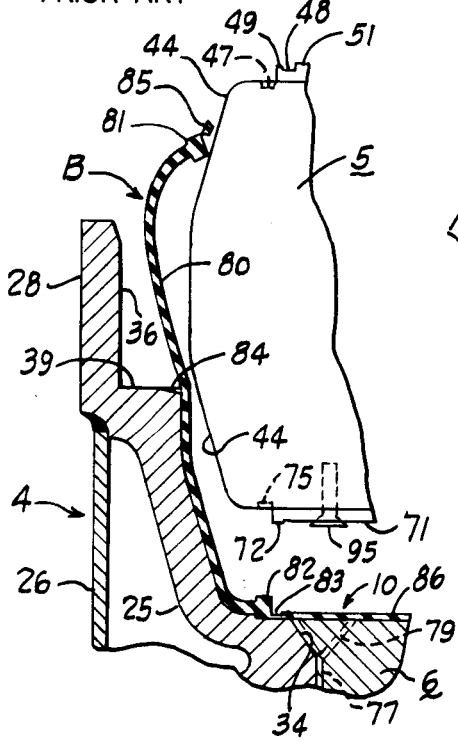
FIG. 8 is a fragmentary vertical sectional view showing the position of the curing bladder and the core as the core is lifted out of the bladder.

After the butyl rubber composition has been cured for the proper period of time to produce an elastic rubber with the desired physical properties, the pressure is released and the lower mold half 4 is moved to a lower position, for example as in FIG. 1. Then air under a suitable pressure, such as 70 to 100 psig, is admitted to the tube 90 from an air hose above the core to assist in separating the core from the molded rubber. The check valve 92 opens to admit the air between the diaphragm 10 and the bottom of the core as the core is lifted by its associated piston and piston rod 11. The air causes the hot rubber to expand as indicated in FIG. 8 so that the bead portion 81 stretches to a diameter large enough for core removal. The air escapes between said bead portion and the polished external surface 44 of the unitary core 5 so that the air pressure within the bladder B during core removal is relatively low (i.e. 4 to 8 psig) even when the pressure of the air supplied to tube 90 approaches 100 psig.

After the core 5 is raised to a position as shown in FIG. 1, the base plate 6 is raised to the position shown in broken lines in that figure and the diaphragm 10 is manually removed with the bladder B. Thereafter the diaphragm is cut along the groove 83 to separate it from the curing bladder and the annular fin 84 is removed. The external surface of the bladder is preferably provided with a conventional molded pattern as is customary in the art. The polished external surface 44 of the core provides the bladder with a smooth defect-free internal surface.

In the mold shown herein, the diaphragm has a substantial thickness to facilitate the flow of rubber and to assure that the cavity below the core is filled before the curing interferes with rubber flow. The thickness of the diaphragm 10 is in the range from about 0.10 to about 0.25 inch and preferably from about 0.15 to about 0.20 inch in a mold of the type shown herein.

I claim:

1. In a press for shaping and vulcanizing tire curing bladders, a mold comprising a generally cylindrical shaped core having a top surface, a bottom surface, a unitary peripheral external wall, said wall having a generally smooth surface; an upper mold section and a lower mold section wherein during shaping and vulcanizing said tire curing bladder said upper mold section and said lower mold section are positioned to generally envelop said core thereby forming a cavity between said mold and said core in a shape of said bladder; a central base plate located in said lower mold section below said bottom face of said core and mounted to move axially relative to said lower mold section, said base plate having a grooved upper surface which is adjacent to and spaced from said bottom surface of said core defining a bottom mold cavity in which a diaphragm of rubber having a wall thickness less than that of said bladder is formed during shaping and vulcanizing a tire curing bladder; a guide means attached to said base plate where said guide means positions said core relative to said plate when said mold is closed; and a valve means to supply pressurized gas between said diaphragm and core to separate the core from the diaphragm and to expand the bladder radially as the core is removed from the bladder.

2. A mold as set forth in claim 1 further comprising means to support said core out of contact with said lower mold section during shaping and vulcanizing of said tire curing bladder.

3. A press as claimed in claim 2 wherein said valve means includes a check valve.

4. A press as claimed in claim 3 wherein said bottom surface of said core has a groove corresponding to said grooved upper surface of said base plate.

5. A press as claimed in claim 4 wherein said base plate has a series of dovetail grooves for holding said diaphragm during removal of the core from the bladder.

6. A press as claimed in claim 5 wherein said base plate has a plurality of vent passages to remove air from said bottom mold cavity as rubber fills said cavity.

* * * * *